(12) United States Patent
Harris

(10) Patent No.: US 11,744,241 B2
(45) Date of Patent: Sep. 5, 2023

(54) FOOT-HOLD ANIMAL TRAPPING APPARATUS

(71) Applicant: Kimball Harris, Conrad, MT (US)

(72) Inventor: Kimball Harris, Conrad, MT (US)

( * ) Notice: Subject to any disclaimer, the term of this patent is extended or adjusted under 35 U.S.C. 154(b) by 0 days.

(21) Appl. No.: 17/557,817

(22) Filed: Dec. 21, 2021

(65) Prior Publication Data

US 2022/0110311 A1  Apr. 14, 2022

Related U.S. Application Data

(63) Continuation-in-part of application No. 16/350,158, filed on Oct. 9, 2018, now abandoned.

(51) Int. Cl.
*A01M 23/26* (2006.01)

(52) U.S. Cl.
CPC .................................. *A01M 23/26* (2013.01)

(58) Field of Classification Search
CPC .... A01M 23/26; A01M 23/265; A01M 23/28; A01M 23/36
See application file for complete search history.

(56) References Cited

U.S. PATENT DOCUMENTS

| | | | | |
|---|---|---|---|---|
| 378,767 A * | 2/1888 | Summers | ............... | A01M 23/26 43/88 |
| 1,191,909 A * | 7/1916 | Phillips | ................. | A01M 23/26 43/88 |
| 1,246,782 A * | 11/1917 | Partello | ................. | A01M 23/26 43/93 |
| 1,421,610 A * | 7/1922 | Svehla | .................. | A01M 23/00 43/88 |
| 1,464,399 A * | 8/1923 | Allison | ................. | A01M 23/00 43/88 |
| 1,889,351 A * | 11/1932 | Cooper | ................. | A01M 23/26 43/88 |
| 1,961,075 A * | 5/1934 | McMullen | ............ | A01M 23/12 43/88 |
| 1,997,932 A * | 4/1935 | Houts | .................... | A01M 23/30 43/92 |
| 2,506,834 A * | 5/1950 | Hurthig | ................. | A01M 23/24 43/93 |
| 4,424,640 A * | 1/1984 | Cook | ..................... | A01M 23/26 43/93 |
| 4,505,064 A * | 3/1985 | Smagner | ............... | A01M 23/26 43/96 |
| 4,660,319 A * | 4/1987 | Ellwood | ............... | A01M 23/26 43/96 |
| 9,848,594 B1* | 12/2017 | Lawrence | ............. | A01M 23/24 |

* cited by examiner

*Primary Examiner* — Magdalena Topolski
*Assistant Examiner* — Marisa V Conlon
(74) *Attorney, Agent, or Firm* — Dale J. Ream

(57) ABSTRACT

An animal trap includes a pair of complementary curved jaws rotatably mounted on a frame or base plate, and springs on the frame cooperating with a pair of opposed levers for urging the jaws toward each other from an open position to a closed or animal foot-holding restraining position. A foot pan is located on the frame between the jaws. A trigger release assembly is employed to restrain the jaws in the open position by being engaged between the pan and jaws. When the animal steps on the pan causing it to move axially downward, the trigger-release assembly is activated causing the spring-biased levers to close the jaws about the foot of the animal.

3 Claims, 5 Drawing Sheets

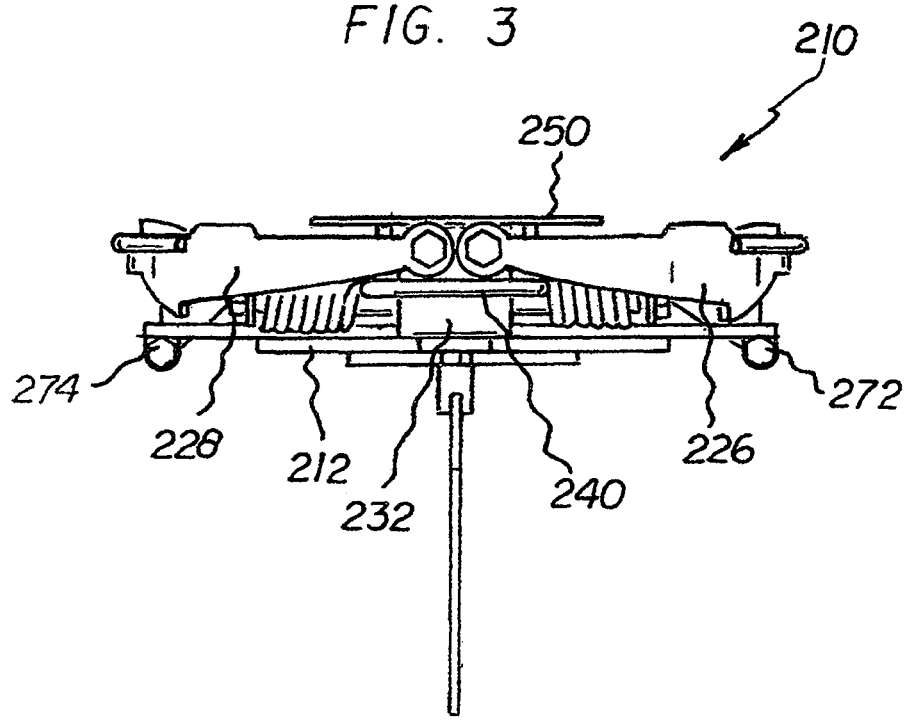
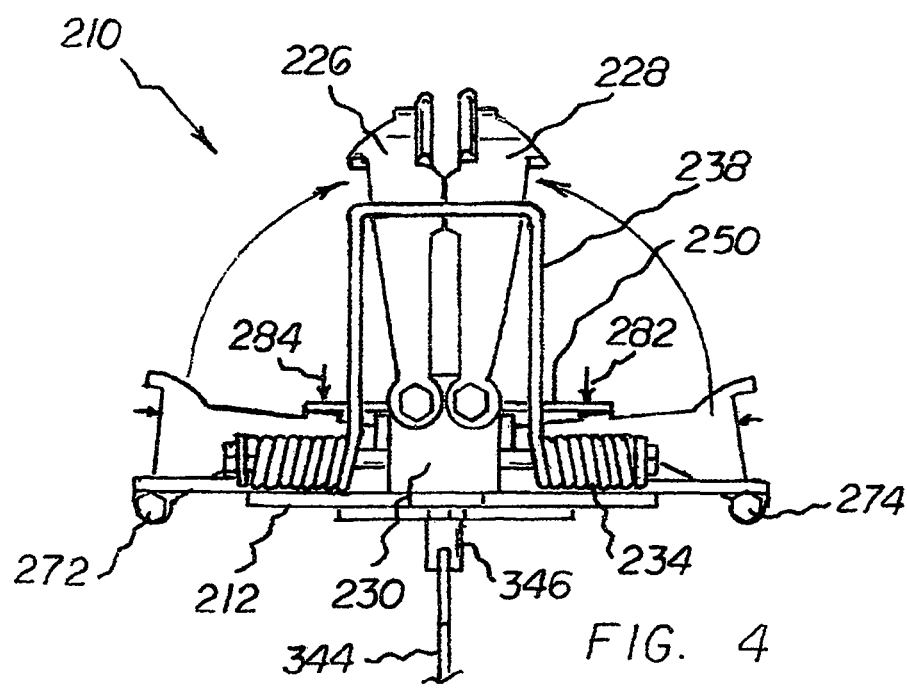

FOOT-HOLD ANIMAL TRAPPING APPARATUS

REFERENCE TO RELATED APPLICATIONS

This application is a continuation-in-part application claiming priority of U.S. patent application Ser. No. 16/350,158 filed on Oct. 9, 2018 and titled Foot-Hold Animal Trapping Apparatus, which claims the priority of U.S. patent application Ser. No. 15/732,234 filed Oct. 10, 2017 and titled Foot-Hold Animal Trapping Apparatus.

BACKGROUND OF THE INVENTION

The present invention relates generally to animal traps and, more particularly, to a foot-holding, spring-biased, portable trap suitable for restraining small animals without causing injury to same.

Portable, spring-biased, animal traps for snaring small animals are well known. For example, U.S. Pat. No. 4,972,626 (Medvetz) describes an animal frap comprising a pair of complementary jaws rotatably mounted on a frame or base plate, and springs on the frame cooperating with a pair of opposed levers for urging the jaws toward each other from an open position to a closed or animal foot-holding restraining position. A pivotally-mounted pan is located on the frame between the jaws. A trigger-release assembly including a "dog" is also pivotally mounted on the frame and is employed to restrain the jaws in the open position by being engaged with the pivotal pan. When the animal steps on the pan causing it to pivot, the "dog" is released causing the spring-biased levers to close the jaws about the foot of the animal. Other prior devices in this general category may be read about in the following additional patents: U.S. Pat. No. 4,272,907 (Skapura); U.S. Pat. No. 4,486,972 (Heifrich); U.S. Pat. No. 5,691,510 (Turman); and U.S. Pat. No. 7,421,821 (Butera).

Although the prior traps of the Medvetz-type have become popular and are in widespread use, because the "dog" is mounted away from the pan, among other reasons, so-called "dead spots" or "dead zones" prevent the pan from being depressed if the animal's foot lands in the wrong place on the pan.

Accordingly, a vexing need exists for providing a foot-hold trap of the foregoing type where the activating pan and the triggering mechanism are so configured and arranged as to avoid the "dead spots" in prior art pan activated foot-hold animal traps. This need is met by the present invention which briefly described has as its primary object the provision of an animal trap where the pan assembly is "center driven" i.e., the pan moves axially downwardly toward the frame when stepped on by an animal's foot and activates a novel trigger-release assembly located proximal to the pan to cause the trap's jaws to move from the open to the closed position. Such a novel "center driven" pan arrangement has been found to all but eliminate the "dead spot" or dead zone" problem affecting the prior art traps. More particularly, each outrigger arm associated with a respective locking arm extends along a bottom surface completely between opposed radial edges of the foot-pan as will be described later.

Another object of the present invention is to provide a novel foot-hold animal trap of the foregoing type which is simple in its construction, comparatively inexpensive in its manufacture, thoroughly efficient and reliable in it use and operation, and otherwise well adapted to the purpose for which it is designed.

The above and numerous other objects of the invention will become evident from the following more detailed description of the invention, taken with reference to the annexed drawings.

BRIEF DESCRIPTION OF THE DRAWINGS

FIG. 3 is a side view taken along line 3-3 of FIG. 2 showing the jaws in a closed position.

FIG. 4 is a side view similar to FIG. 3, but showing the jaws activated into a closed or trapping position by depression of the center pan thereof.

DESCRIPTION OF THE PREFERRED EMBODIMENT

With reference to the drawings, a preferred embodiment of the present invention will now be described in considerable detail, it being understood that the foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described herein may be resorted to in carrying out the present invention.

In my prior co-pending application Ser. No. 15/732,234; filed Oct. 10, 2017, incorporated herein in full, I disclose two other preferred embodiments of the present invention, each illustrating a preferred application of my novel inventive concept of providing a foot holding trapping apparatus where the trigger assembly is responsive to the center or foot pan moving axially downwardly toward the base plate when stepped on by an animal's foot, all but eliminating the "dead spot" or "dead zone" problem affecting the prior art traps where pivotally mounted pans and jaw-edge trigger mechanisms are employed. In the present application, I fully disclose a third such preferred embodiment which because of its simplicity of design and unique structural features constitutes a substantial improvement over the prior two preferred embodiments.

Figure 7:
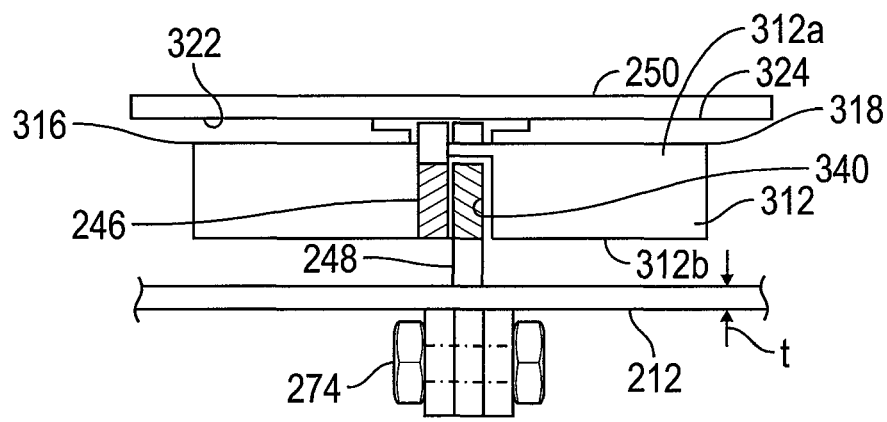
FIG. 7 is a partial cross-section taken along line 7-7 in FIG. 6.

Thus, turning initially to FIGS. 1-5, the third such improved and mostly preferred embodiment of the present invention now will be described in greater detail. Substantially as depicted FIGS. 1-5, the third or mostly preferred embodiment of my foot-hold animal trapping apparatus invention generally is indicated by reference sign 210 and comprises a generally cruciform-shaped, substantially flat, base plate 212 having first and second opposed arm segments 214, 216 in nominal perpendicular relation to a pair of third and fourth opposed arm segments 218, 220. Base plate 212 has a thickness "t" (FIG. 7) and preferably is fabricated of machine steel stock or other known stiff, strong, durable material employed in the construction of animal traps.

As in the first and second preferred embodiments, the base plate 212 serves as a rigid platform or framework for supporting the primary components of the animal trap, namely the curved jaw members, the spring assemblies, the spring-driven jaw-lever members, the center or foot pan, and the trigger assembly or trigger release for setting the jaws in the "open" condition and for automatically activating the spring assemblies to drive the jaws to a "closed" condition when an animal steps anywhere on the top surface of the foot or center pan.

More specifically, first and second curved jaw members 226, 228 are suitably journaled in corresponding upright ears or lugs 230, 232 affixed to first and second opposed arm segments 214, 216, respectively. Conventional animal trap spiral spring assemblies 234, 236 suitably are fixedly mounted on first and second base arm segments 214, 216, respectively, generally parallel to each other and spaced from each other, and extend substantially perpendicular to the imaginary longitudinal axis (not shown) defined by third and fourth base arm segments 218, 220. As is well known in the art, each spring assembly 234, 236 includes a central, substantially rectangularly-shaped lever plate or jaw-pusher frame member 238, 240, respectively. Each lever plate 238, 240, in turn, has a central opening 242, 244 suitably dimensioned to defined transverse side portions on each lever plate sufficient for engaging first and second jaw members 226, 228 and urging them to move from the "open" position to the "closed" position, as is well known in the spring-loaded foot-trap art.

Figure 1:
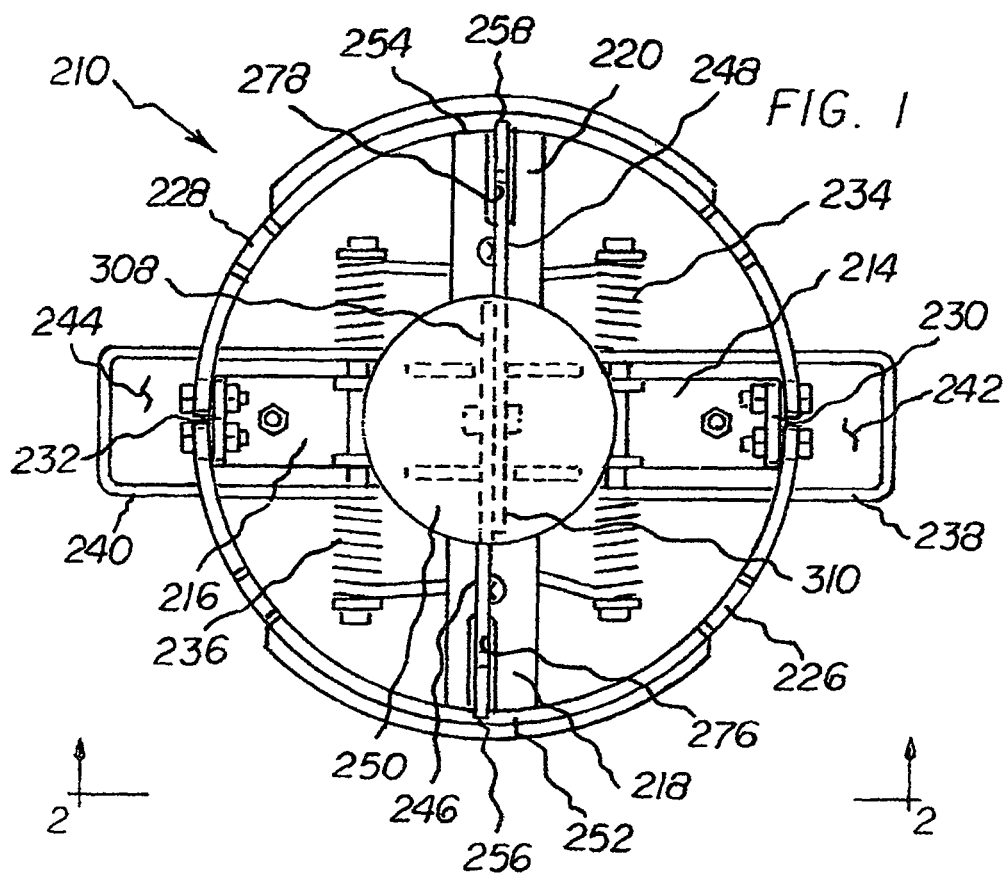
FIG. 1 is a plan view showing the jaws of a novel foot-hold animal trap according to a preferred embodiment of the present invention in an open position.
Figure 2:
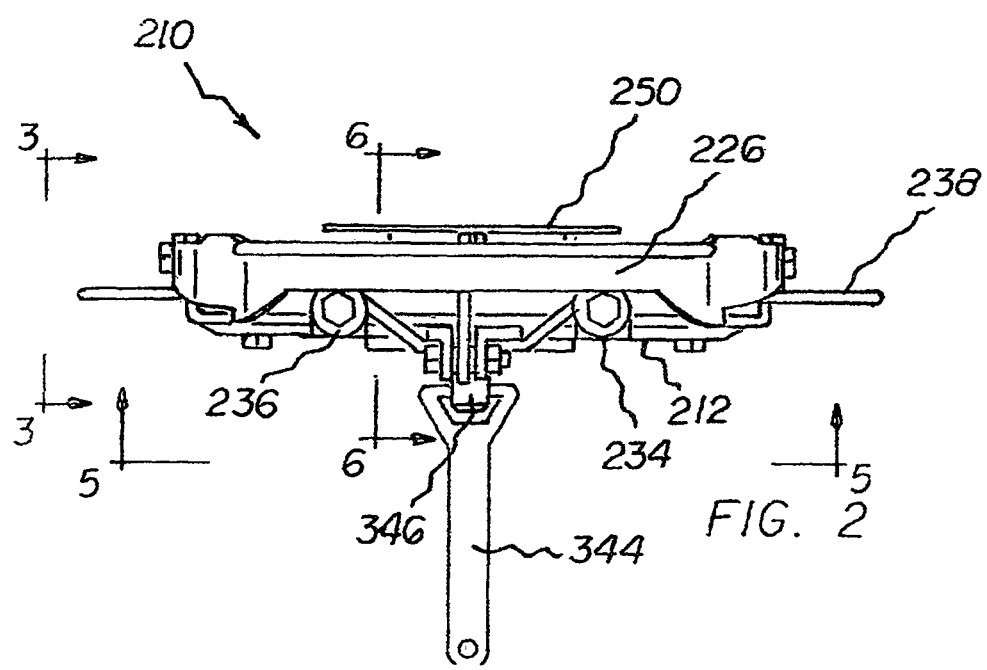
FIG. 2 is a side view taken along line 2-2 of FIG. 1.
Figure 5:
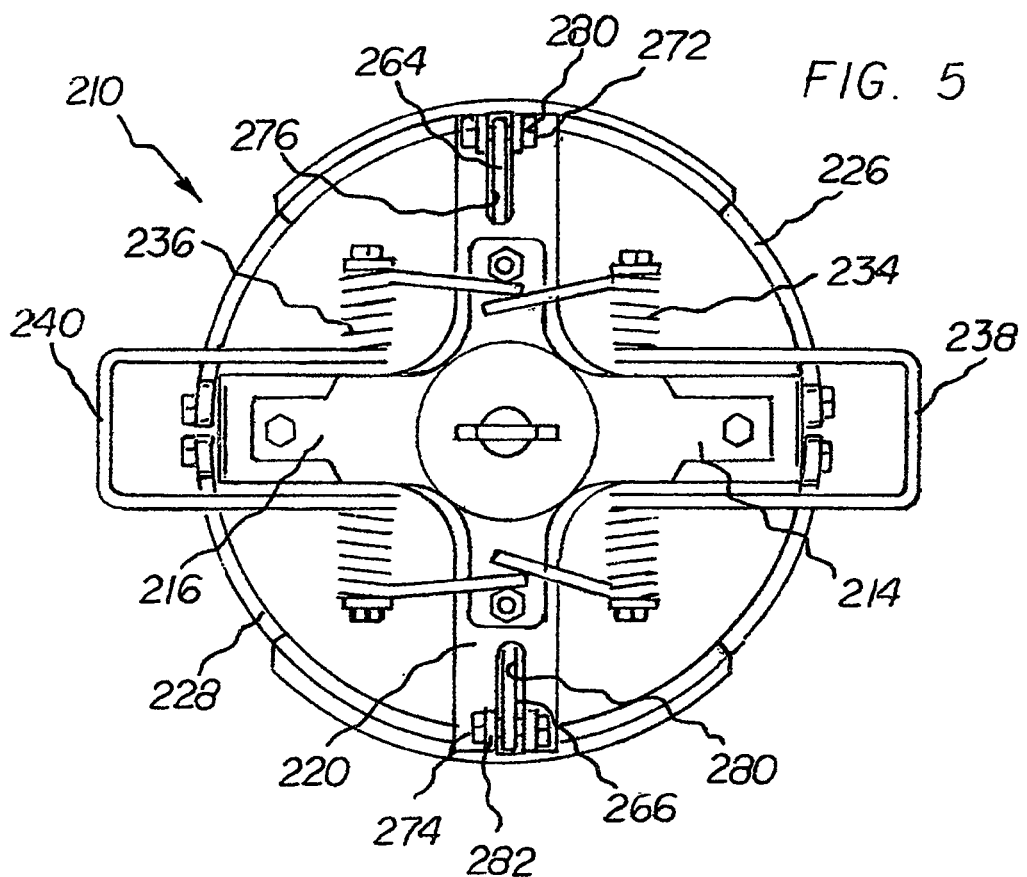
FIG. 5 is a bottom view taken along line 5-5 of FIG. 2.

Thus, in FIGS. 1, 2 and 5, the lever plates 238, 240 are shown in the down position corresponding to the "open" or "set" position of jaw members 226, 228 whereas in FIG. 4, the levers 238, 240 are shown in the fully "up" position (caused by the action of spring assemblies 234 and 236) corresponding to the "closed" or "trapping" position of the jaw members 226 and 228.

In order to "set" the trap and maintain the first and second jaw members 226, 228 in the open position, first and second opposed jaw locking arms 246, 248 are provided extending generally longitudinally and co-axially with respect to third and fourth arm segments 218, 220, and substantially parallel to and between spring assemblies 234, 236 (FIGS. 1 and 4-6), in a partially juxtaposed or overlapping manner with respect to each other. The jaw locking arms 246, 248 form part of the trigger assembly or trigger release of the present invention, situated between the center pan 250 of the trapping apparatus and jaws 226, 228, as will be explained in further detail below.

Suffice it for now, jaw locking arms 246, 248 extend radially underneath center pan 250 with respect to the imaginary central axis of the apparatus (not shown) and longitudinally along third and fourth arm segments 218, 220. Jaw locking arms 246, 248 terminate distally substantially on or about the central portion of each jaw member 226, 228, respectively, where, more specifically, each jaw locking arm 246, 248 is adapted to lockingly and releasably engage the inside peripheral curved edge portions 252, 254 of jaw members 226, 228, respectively.

Such locking engagement is affected by means of a releasable "dog" in the form of an upper locking finger or radial projection 256, 258, respectively, and a substantially straight bearing end surface 260, 262, on the distal end of each locking arm when the trap apparatus is "set" in the open position (substantially as depicted in FIGS. 1-3 and 6).

Each jaw locking arm 246, 248, further has a radially distal lower pivot portion 264, 266 through which openings 268, 270 are provided respectively, for receiving axle fasteners 272, 274, respectively. As best seen in FIGS. 1, 2 and 5, the distal end portions of third and fourth arm segments 218, 220 are slotted at 276, 278 respectively, to receive the jaw locking arm pivot portions 264, 266 and openings 268, 270, respectively. Suitable bifurcated journal bushings 280, 282 are provided extending below third and fourth arm segments 218, 220, respectively, to receive aligned openings 268, 270 and axle fasteners 272, 274, respectively (FIG. 5).

By this arrangement, the jaw locking arm radially distal lower pivot portions 264, 266 are pivotally anchored on the third and fourth arm segments of base plate 212, respectively, and thus capable of limited pivotal movement relative to the base plate between two positions: the first or "locking condition" where each jaw locking arm is in locking engagement with its corresponding jaw member (FIG. 1), and the second or "released" condition where the jaw locking arms have been caused to rotate downwardly in response to downward movement of center pan 250, as indicated by arrows 282 and 284, respectively (FIG. 4).

In accordance with an important feature of the invention, center pan 250 is supported substantially centrally on the base plate 212 over and above the juncture of the radially inwardly extending juxtaposed portions of the first and second jaw locking arms 246, 248. Center pan 250 (a.k.a. the foot-pan) has a substantially circular shape and a continuous radial edge that is operatively connected to locking arms 246, 248 by means of a pan-two-locking-arm link member generally indicated by reference 286.

Figure 6:
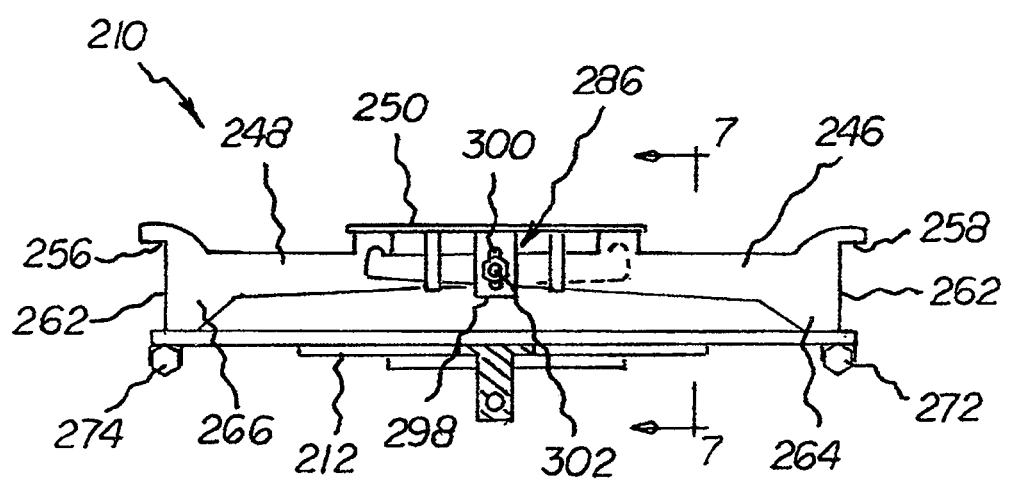
FIG. 6 is a partial cross-section taken along line 6-6 of FIG. 2 showing the trigger assembly in a set position when the jaws of the frap are open.
Figure 8:
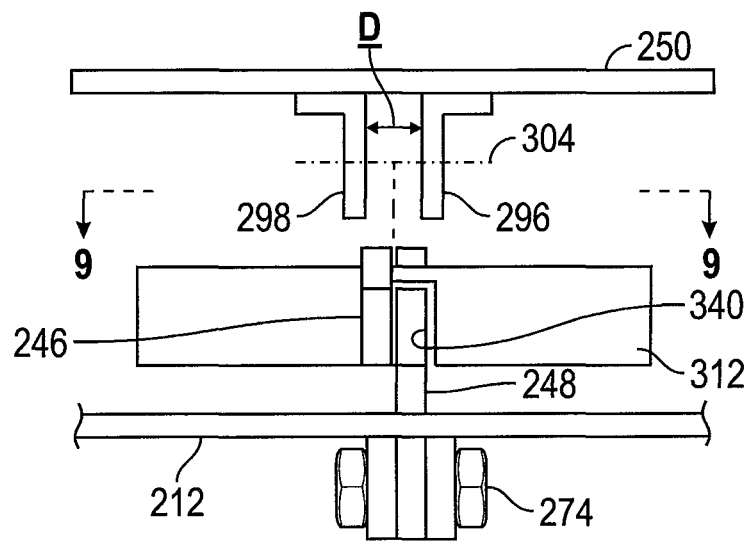
FIG. 8 is similar to FIG. 7, but shows the center pan in exploded view relative to the trigger assembly.
Figure 9:
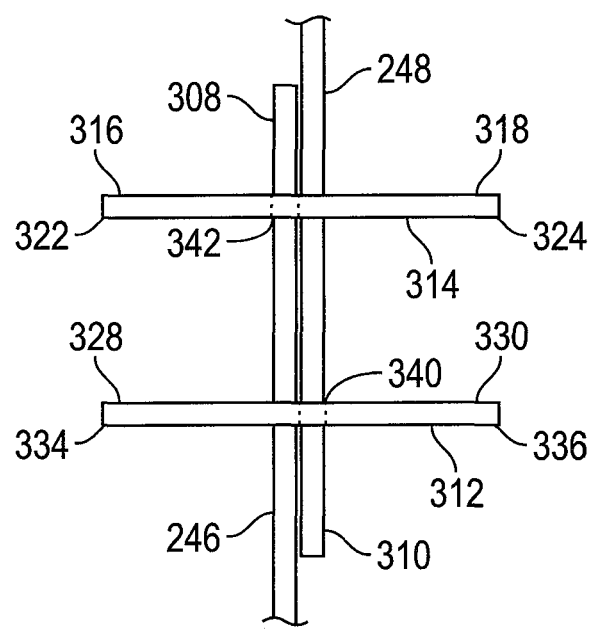
FIG. 9 is a plan view of a portion of the trigger assembly taken along line 9-9 in FIG. 8.
Figure 10:
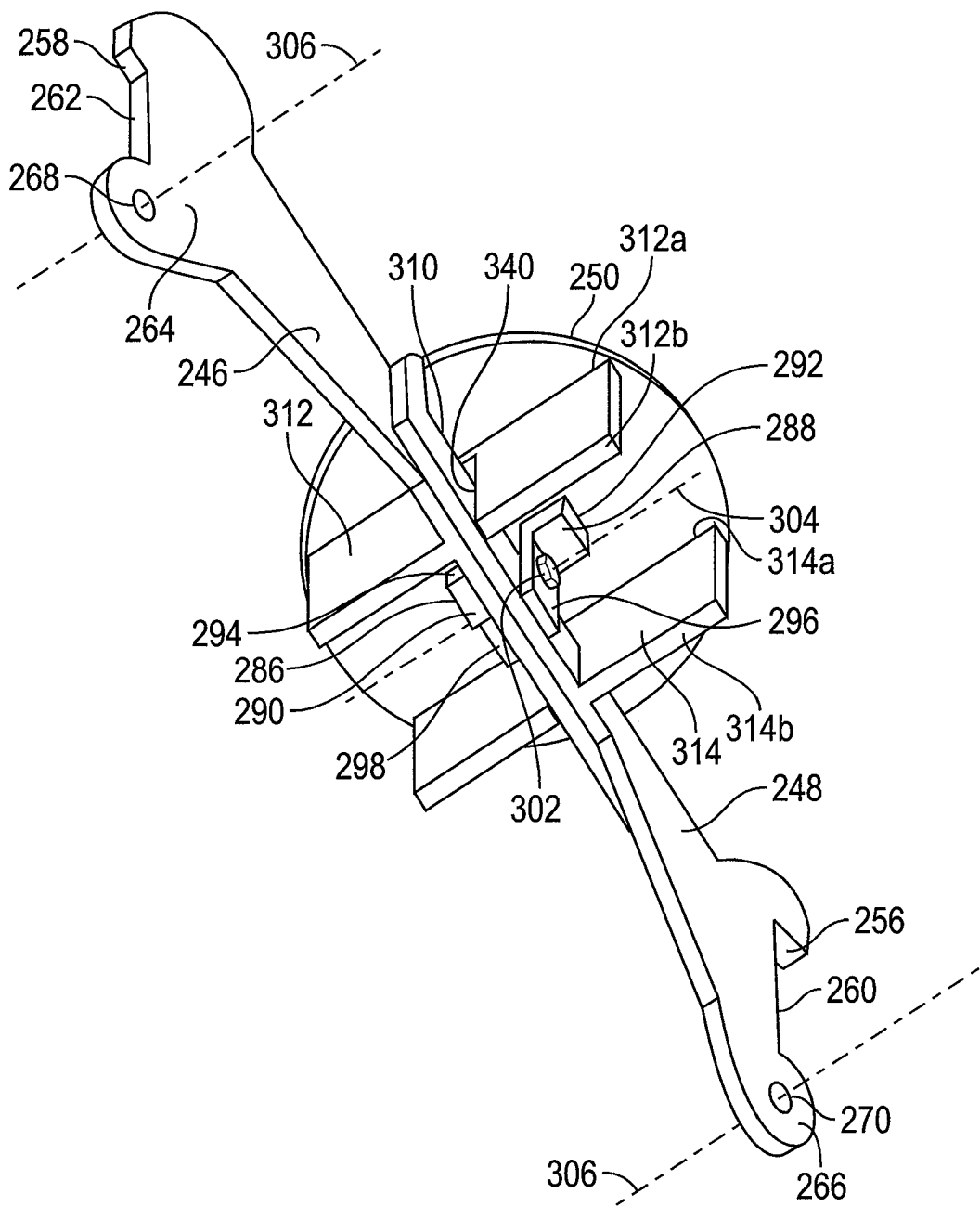
FIG. 10 is a perspective view taken from below and to the left inside of the trigger assembly showing the trigger assembly of the invention in engagement with the underside of the center pan.

Substantially as depicted in FIG. 10, pan-to-locking-arm link member 286 comprises first and second, spaced apart right-angle struts 288, 290 suitably affixed as by welding, soldering, or brazing the horizontal portions 292, 294 of each shut to the underside of the center pan 250, substantially centrally with respect to the underside of the center pan 250, more or less as depicted in FIGS. 6, 8 and 10.

Each of the vertically downwardly extending strut portions 296, 298 of the pan-to-locking-arm link member 286 has an opposed oblong-shaped through opening 300, respectively (only one of which is shown in FIG. 6), for receiving a suitable axle fastener 302 that extends completely through the oblong through openings 300 in opposed strut portions 296, 298. The axle fastener 302 also extends through axially-aligned through passages (not shown) in both juxtaposed locking arms to define a common hinge axis 304 extending through the strut portions 296, 298 and the confronting juxtaposed locking arm portions there between (FIG. 10), which latter axis generally is parallel to the distal jaw locking arm pivot axes 306 defined by through openings 268, 270 and axle fasteners 272, 274, respectively.

It will be appreciated, that the spacing "D" between strut portions 296, 298 is such as to loosely accommodate the thickness of the two confronting juxtaposed jaw locking arm portions (FIGS. 8 and 10).

Link member 286 and/or its axle fastener 302 suitably serve at least the following many functions. First, this construction pins the juxtaposed confronting radially inner locking arm portions 308, 310 of the locking arms 246, 248 together at a defined common hinge location (axis 304) intersecting the imaginary central vertical axis of the center pan 250.

Second, it enables the confronting juxtaposed locking arm radially inner portions 308, 310 to rotate relative to each other about such defined common hinge location (i.e., defined by axis 304) and thus facilitates rotation of the locking arms per se about axes 306 while remaining pinned together about such common hinge joint when and as the common hinge joint is raised and lowered relative to a vertical axis by the action of raising and lowering the center pan 250, as the case may be.

Third, this construction loosely vertically axially connects the center pan 250 to the commonly hinged locking arm juxtaposed portions 308, 310 via the opposed oblong-shaped through openings 300 in opposed right-angle struts 296, 298.

And fourth, it facilitates upward or vertical movement of the locking arm common hinge joint, and consequent rotation of the locking arms upwardly to facilitate a "locking condition" of the trap by merely lifting the center pan 250 upwardly after the jaws of the trap have been placed in a fully open condition, thereby setting the trap easily and quickly (see FIG. 6).

In accordance with another important feature of the invention, the application of a downward force anywhere on the top of the center pan 250 to effectively spring the trap apparatus after it is "set," is enhanced by the provision of a series of "outrigger arms" integrally affixed to the locking arm medial portions as will now be explained with reference to FIGS. 6-10.

Each locking arm 246, 248 has its own corresponding fixed "outrigger" arm 312, 314. Thus, the first outrigger arm 312 may be integrally attached to its corresponding locking arm inner portion 308. Similarly, the second outrigger arm 314 may be integrally attached to its corresponding locking arm inner portion 310 with the outrigger arms being spaced apart suitably and axially on opposed sides of the pan-two-locking-arm link member 286 (FIG. 10).

The first outrigger arm 312 includes a generally rectangular configuration having a solid construction and comprising a top edge 312a having an elongate linear configuration and a bottom edge 312b parallel to and opposite the top edge 312a. Of critical importance, the top edge 312a is in uninterrupted contact with the bottom surface of the foot pan 250 along an entirety of an area extending substantially between opposed radial edges of the foot pan 250 (FIG. 10). Similarly, the second outrigger arm 314 includes a generally rectangular configuration having a solid construction and comprising a top edge having an elongate linear configuration and a bottom edge 314b parallel to and opposite the top edge 314a. Of critical importance, the top edge is in uninterrupted contact with the bottom surface of the foot pan along an entirety of an area extending substantially between opposed radial edges of the foot pan 250 (FIG. 10).

Respective bottom edges 312b, 314b are open and in communication with an upstanding slot 340, 342 (FIGS. 9 and 10) defined by or recessed into the outrigger arms, 312, 314.

By the foregoing arrangement, and substantially as depicted in FIG. 10, the two spaced apart outrigger arms 312, 314 provide a continuous set of contact regions for engagement by the foot pans under surface. In other words, when the top side of the foot pan 250 is contacted anywhere by an animal's foot, the continuous set of contact regions closest to the point of contact will transmit a downward force through its corresponding outrigger arm effective to move the locking arm, hinge down release officially to rotate the locking arms about their axes 306 and release the jaws of the trap (FIG. 4). When this happens, locking arms 246, 248 rotate relative to each other about the hinge axis 304 defined by axle fastener 302.

The slots 340, 342 first described above are critical to accommodate the rotation of locking arms 246, 248. More particularly, the opening defined by the bottom edge 312b of the first outrigger arm 312 allows access into the slot 340. Likewise, the opening defined by the bottom edge 314b of the second outrigger arm 314 allows access into the slot 342. Each slot is configured receive a "nose" portion of the respective locking arm 246, 248 when the trap is "set" and functions as described below. Specifically, the first slot 340 defined by the outrigger arm 312 on the first locking arm 246 is configured to receive the radially inner "nose" portion of the second locking arm 248 whereas the second slot 342 is defined by outrigger arm 314 on the second locking arm 248 and configured to receive the radially inner "nose" portion of the first locking arm 246.

By virtue of the foregoing construction, the "nose portions" of locking arms 246, 248 are able to rotate relative to each other within their respective corresponding spots 340, 342, respectively, when the common hinge joining the first and second locking arms 246, 248 together travels vertically downwardly upon an animal's foot contacting virtually any location on the top surface of foot pan 250. It is understood that the first and second slots 340, 342, are accommodated due to the solid block construction of the outrigger arms 312, 324 that extend completely between respective top and bottom edges, respectively (other than the slots themselves).

As shown in FIGS. 2-4, a pivotal, rotatable strap member 344 is provided suitably attached to a "swivel" connection 346 suitably securely mounted in the bottom surface of base plate 212. The strap may be used to connect the trapping apparatus embodiment of the present invention to a buried ground spike or like anchoring device via a chain (not shown). Such a "swivel" connection and strap member combination may additionally be used as a convenient carry handle for the trapping apparatus of the invention.

From, the foregoing, it further will be appreciated that the novel "center-driven" pan and trigger assembly employed in both embodiments of the present invention as disclosed herein overcomes a vexing problem affecting prior art "foot-hold" traps of the type herein concerned, by providing an animal trap where the trigger assembly is responsive to the pan moving axially downwardly toward the base plate when stepped on by an animal's foot, all but eliminating the "dead spot" or "dead zone" problem affecting the prior art traps where pivotally mounted pans and jaw-edge trigger mechanisms are employed.

The terms "trigger assembly" or "trigger release" as used in the present application and in the claims is to be construed broadly and means any and all disclosed structure or mechanisms located between the center pan of the trapping apparatus and the open jaws of the trapping apparatus when the latter is in an open or "set" condition, and which is activated in whole or in part, when an animal steps anywhere on the top surface of the center pan.

As to the manner of usage and operation of the instant invention, the same is apparent from the above disclosure, and accordingly, no further discussion relative to the manner of usage and operation need be provided.

In summary, an important feature of the present invention is the provision of a foot center pan which rather than being pivotally mounted on the trap's base plate, is mounted in such a way as to be caused to move axially in a downward direction essentially perpendicular toward the base plate when an animal steps on the pan. Such an arrangement is designated "center-driven-pan," and achieves the important advantage of avoiding so-call "dead spots" on the panel where stepping on the pan in certain locations or areas is ineffective to activate the trap's trigger mechanism and "spring the trap."

In its broadest aspect, the present invention comprises an animal trap characterized by a pair of complementary curved jaws rotatably mounted on a frame or base plate, and springs on the frame cooperating with a pair of opposed levers for urging the jaws toward each other from an open position to a closed or animal foot-holding restraining position. A center or foot pan is located on the frame between the jaws. A trigger-release assembly is employed to restrain the jaws in the open position by being engaged between the center pan and the jaws. When the animal steps on the pan causing it to move axially downward, the trigger-release assembly is activated causing the spring-biased levers to close the jaws about the foot of the animal. The jaws contain the usual abutments and stops for preventing undue harm to any snared animal.

The present invention, substantially as disclosed in the present application, is commercially available under the brand designations: CENTERFIRE™ or HARRIS™.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. Accordingly, it is desired that the present invention be limited only by the true spirit and scope of the appended claims.

The invention claimed is:

1. An animal trapping apparatus, comprising;
   a frame and a pair of complementary jaws rotatably mounted on said frame;
   at least one spring assembly on said frame for cooperating with a pair of opposed levers for urging said complementary jaws toward each other from a first open position to a second closed or animal foot-holding restraining position;
   a foot pan movably mounted on said frame, said foot pan having a top surface and a bottom surface opposite said bottom surface; and
   a trigger assembly comprising:
      a pair of juxtaposed locking arms mounted on said frame axially below said foot pan, each having a first portion engaged with said bottom surface of said foot pan and a second portion pivotally coupled to said frame and configured to receive a respective jaw so as to restrain said complimentary jaws in said first open position,
      said pair of juxtaposed locking arms being pivotally coupled together along a center-driven vertical axis between said frame and said foot pan, wherein said pivotal coupling defines a horizontal pivot axis perpendicular to said center-driven vertical axis;
   wherein said pair of juxtaposed locking arms each includes multiple outrigger arms spaced apart from one another and each being perpendicular to an imaginary longitudinal axis defined by said pair of juxtaposed locking arms, each outrigger arm having an upright segment in communication with said bottom side of said foot pan so as to form a plurality of contact regions for said foot pan and such that a downward force on any of said plurality of contact regions causes a downward movement of said first portion which pivotally causes an opposite movement of a respective second portion such that said respective second portion releases said respective jaw of said frame such that said at least one spring assembly causes said pair of opposed levers to urge said complementary jaws toward each other and move from said first open position to said second closed or animal foot-holding restraining position;
   said pair of juxtaposed locking arms is pivotally supported on said frame and is operatively coupled to said bottom surface of said foot pan via a pan-to-locking arm link;
   said pan-to-locking arm link includes first and second spaced apart right-angle struts, respectively, said first and second struts each having a horizontal portion affixed to said bottom surface of said foot pan;
   wherein each outrigger arm includes (1) a top edge having an elongate linear configuration that is in contact with said bottom surface of said foot pan along an entirety of an area between opposed radial edges of said foot pan so as to form the continuous set of contact regions along said top edge of said outrigger arm, respectively, and (2) a bottom edge opposite said top edge for receiving and engaging a nose portion of a respective locking arm in a nested relationship, and that defines a slot extending upwardly from said bottom edge.

2. The apparatus as in claim 1 wherein said second portion of said pair of locking arms each includes a locking dog, respectively, that is configured to engage a different one of said jaws comprising said complimentary pair of jaws.

3. The apparatus as in claim 1 wherein:
   said first portion and said second portion of said pair of juxtaposed locking arms are situated along an imaginary longitudinal axis defined by said pair of juxtaposed locking arms; and
   said each outrigger arm is situated perpendicular to the imaginary longitudinal axis defined by said pair of juxtaposed locking arms.

* * * * *